(12) United States Patent
Perlin

(10) Patent No.: US 9,348,463 B2
(45) Date of Patent: May 24, 2016

(54) RETROREFLECTION BASED MULTITOUCH SENSOR, METHOD AND PROGRAM

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 2085 days.

(21) Appl. No.: 11/888,729

(22) Filed: Aug. 2, 2007

(65) Prior Publication Data

US 2008/0060854 A1 Mar. 13, 2008

Related U.S. Application Data

(60) Provisional application No. 60/835,747, filed on Aug. 3, 2006.

(51) Int. Cl.
*G06F 3/041* (2006.01)
*G06F 3/042* (2006.01)

(52) U.S. Cl.
CPC .... G06F 3/0425 (2013.01); *G06F 2203/04109* (2013.01)

(58) Field of Classification Search
CPC ..... G06F 3/041; G06F 3/0412; G06F 3/0421; G06F 3/0425; G06F 3/0428
USPC .................................................. 345/173–179
See application file for complete search history.

(56) References Cited

U.S. PATENT DOCUMENTS

| | | | | |
|---|---|---|---|---|
| 6,061,177 A * | 5/2000 | Fujimoto | ...................... | 359/443 |
| 7,154,527 B1 * | 12/2006 | Goldstein et al. | ............... | 348/45 |
| 7,728,821 B2 * | 6/2010 | Hillis et al. | .................... | 345/173 |
| 2002/0163505 A1 * | 11/2002 | Takekawa | ............ | G06F 3/0423 345/173 |
| 2004/0021633 A1 * | 2/2004 | Rajkowski | ..................... | 345/156 |
| 2004/0246358 A1 * | 12/2004 | Isoyama | .................. | 348/333.01 |
| 2005/0001824 A1 * | 1/2005 | Yoshimura | ..................... | 345/179 |
| 2005/0128596 A1 * | 6/2005 | Li et al. | ......................... | 359/619 |
| 2005/0254690 A1 * | 11/2005 | Nagasaka et al. | ............. | 382/115 |
| 2006/0044282 A1 * | 3/2006 | Pinhanez et al. | ............... | 345/173 |
| 2006/0197752 A1 * | 9/2006 | Hurst et al. | ..................... | 345/173 |
| 2006/0227120 A1 * | 10/2006 | Eikman | ........................ | 345/175 |
| 2007/0080948 A1 * | 4/2007 | Wernersson et al. | ......... | 345/169 |
| 2007/0201863 A1 * | 8/2007 | Wilson et al. | .................. | 396/429 |
| 2007/0215793 A1 * | 9/2007 | Gruhlke et al. | ............... | 250/221 |
| 2008/0013826 A1 * | 1/2008 | Hillis et al. | .................... | 382/154 |
| 2008/0117183 A1 * | 5/2008 | Yu et al. | ......................... | 345/173 |
| 2008/0158344 A1 * | 7/2008 | Schechterman et al. | ........ | 348/46 |
| 2008/0179507 A2 * | 7/2008 | Han | .............................. | 250/224 |
| 2009/0065583 A1 * | 3/2009 | McGrew | .................. | G01J 3/02 235/454 |
| 2009/0128499 A1 * | 5/2009 | Izadi et al. | ..................... | 345/173 |
| 2010/0302196 A1 * | 12/2010 | Han | ..................... | G06F 3/0425 345/173 |
| 2010/0302210 A1 * | 12/2010 | Han | ...................... | G06F 3/0412 345/175 |

* cited by examiner

*Primary Examiner* — Alexander Eisen
*Assistant Examiner* — Nelson Lam
(74) *Attorney, Agent, or Firm* — Ansel M. Schwartz

(57) ABSTRACT

A detection apparatus includes a multilocation sensor. The apparatus includes a sheet in communication with the sensor, which when a plurality of locations of the sheet are simultaneously activated, the sensor senses these locations, simultaneously with retroreflection.

19 Claims, 9 Drawing Sheets

1. LENTICULAR LENS ARRAY
2. INFRARED VIDEO CAMERA
3. FIRST INFRARED LIGHT SOURCE
4. SECOND INFRARED LIGHT SOURCE
5. COMPUTER

1. LENTICULAR LENS ARRAY
2. INFRARED VIDEO CAMERA
3. FIRST INFRARED LIGHT SOURCE
4. SECOND INFRARED LIGHT SOURCE
5. COMPUTER

RETROREFLECTION BASED MULTITOUCH SENSOR, METHOD AND PROGRAM

This application claims the benefit of U.S. Provisional Application No. 60/835,747, filing date Aug. 3, 2006.

FIELD OF THE INVENTION

The present invention is related to a multilocation sensor for a detection apparatus. More specifically, the present invention is related to a multilocation sensor for a detection apparatus having a sheet in communication with the sensor, which when a plurality of locations of the sheet are simultaneously activated, the sensor senses these locations, simultaneously.

BACKGROUND OF THE INVENTION

As computers become faster and more powerful, and network bandwidth between computers increases, computer-based interfaces are becoming an increasingly central part of how people communicate. The now ubiquitous Windows/Icons/Mouse-Pointer (i.e., WIMP) paradigm was originally designed primarily for single-use. This paradigm results in serious inefficiencies in interaction, since the user can use the mouse to point to only a single location at one time. In contrast, multitouch interfaces allow their user to employ all fingers and both hands at the same time. Note that many interfaces which historically predate the computer have been multitouch (i.e., have involved varied and flexible simultaneous use of multiple fingers on both hands), such as musical instruments (e.g., the piano and guitar), industrial manufacturing equipment, and human driven vehicles such as automobiles and airplanes.

Lee (Lee, S. K., Buxton, W. and Smith, K. C., "A Multi-Touch Three Dimensional Touch-Sensitive Tablet" in Proceedings of CHI '85 (April 1985), ACM/SIGCHI, NY, 1985, pp. 21-25, incorporated by reference herein) and Han et al. (Han, J., "Bi-manual, multi-point, and multi-user interactions on a graphical interaction surface," incorporated by reference herein) and others have demonstrated that computer interfaces based on multitouch devices—devices that can track the position and the time of concurrent touch events upon a surface by multiple fingers and hands—and have shown the utility of such devices through a variety of applications.

In order for such devices to find themselves in widespread use, they need to be inexpensive and robust (i.e., not susceptible to signal error, and capable of operating properly in a variety of operating environments). It is also useful for such devices to be scalable to large size, and not at prohibitive expense, since multitouch interfaces are particularly useful for multi-person interaction, which becomes practical only at large sizes (e.g., the size of a whiteboard, as opposed to the size of a standard notebook computer). It is also desirable, both for reasons of economy of construction and simplicity of operation, for the touch surface itself to be a passive element, rather than an active electronic component. In addition, it is desirable to be able to assemble an arbitrarily large touch surface simply by placing together adjacent sections.

The current invention satisfies all these conditions. It is able to detect multitouch events upon a surface with high quality (high speed and very high signal to noise ratio). The multitouch surface itself is a passive element, which is already manufactured in large quantities and sizes at low cost. All other elements of the device are inexpensive and commercially available.

It is also possible to use the current invention in ways that are not possible with previous methods. For example, the method can be used to create a two-sided touch wall, which also functions as a front and rear projection display wall. Different users can simultaneously touch both faces of this wall, and the system will be able to simultaneously and independently track multitouch events upon both faces of the wall. This capability creates new opportunities for collaborative interfaces, not possible with previously known multitouch techniques.

BRIEF SUMMARY OF THE INVENTION

The present invention pertains to a detection apparatus. The apparatus comprises a multilocation sensor. The apparatus comprises a sheet in communication with the sensor, which when a plurality of locations of the sheet are simultaneously activated, the sensor senses these locations, simultaneously or approximately simultaneously.

The present invention pertains to a detection apparatus. The apparatus comprises a surface. The apparatus comprises a sensor in communication with the surface that detects variable pressure regarding a touch on the surface.

The present invention pertains to a detection apparatus. The apparatus comprises a surface. The apparatus comprises a sensor in communication with the surface that is capable of detecting a touch on a surface and also a presence of an object near the surface but not touching the surface.

The present invention pertains to a detection apparatus. The apparatus comprises a lenslet array where the lenslets are diffractive. The apparatus comprises a sensor for determining where the array is being touched. The sensor includes a first light source producing light at a first frequency, a second light source producing light at a second frequency, a camera which records images from the frequencies of light from the array, and a computer which determines where the surface is being touched from the images.

The present invention pertains to a detection apparatus. The apparatus comprises a surface. The apparatus comprises a sensor for determining where the surface is being touched, including a plurality of cameras that take images of the surface, a first array of lights positioned such that light from the first array is on a vertical line with one or more of the cameras, a second array of lights that are positioned such that light from the second array is on a horizontal line with one or more of the cameras and a computer connected to the cameras which determines where the surface is being touched from the images.

The present invention pertains to a detection apparatus. The apparatus comprises a sheet containing a plurality of elements which are at least one of refractive, diffractive, retroreflective, reflective, or focusing. The apparatus comprises a sensor which determines where the sheet is touched based on light being one of refracted, diffracted, retroreflected, reflected or focused by the sheet to the sensor. As an example in regard to a finger touching a screen (a sheet), the surface is not retroreflective when the finger is just in proximity to the sheet—only when the finger actually touches the sheet.

The present invention pertains to a detection apparatus. The apparatus comprises a sheet having no active components in, on, or adjoining the sheet. The apparatus comprises active components separate and apart from the sheet which determine where the sheet is touched.

The present invention pertains to a method for detection. The method comprises the steps of activating simultaneously a plurality of locations of a sheet. There is the step of sensing these locations simultaneously with a multilocation sensor in communication with the sheet.

The present invention pertains to a method for detection. The method comprises the steps of touching a surface. There is the step of detecting variable pressure regarding the touch on the surface.

The present invention pertains to a method for detection. The method comprises the steps of detecting a touch on a surface with a sensor in communication with the surface. There is the step of detecting a presence of an object near the surface but not touching the surface with the sensor.

The present invention pertains to a method for detection. The method comprises the steps of determining where a surface is being touched with a sensor by taking images of the surface with a plurality of cameras, where a first array of lights is positioned such that light from the first array is on a vertical line with one or more of the cameras, and a second array of lights is positioned such that light from the second array is on a horizontal line with one or more of the cameras. There is the step of determining with a computer connected to the cameras where the surface is being touched from the images.

The present invention pertains to a method for detection. The method comprises the steps of touching a sheet containing a plurality of elements which are at least one of refractive, diffractive, retroreflective, reflective or focusing. There is the step of determining with a sensor where the sheet is touched based on light being one of refracted, diffractive, (retro)reflected or focused by the sheet to the sensor.

The present invention pertains to a method for detection. The method comprises the steps of touching a sheet having no active components in, on, or adjoining the sheet. There is the step of determining where the sheet is touched with active components separate and apart from the sheet.

The present invention pertains to a detection apparatus. The apparatus comprises an autostereo display including a multitouch retroreflective surface and a projector.

The present invention pertains to a detection apparatus. the apparatus comprises a multilocation sensor. The apparatus comprises a sheet having a first side and a second side in communication with the sensor, which when a location of the sheet is activated on the first side and the second side, the sensor senses the locations.

The present invention pertains to a software program stored on a computer readable medium. The program comprises the steps of activating simultaneously a plurality of locations of a sheet. There is the step of sensing these locations simultaneously with a multilocation sensor in communication with the sheet.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 5:
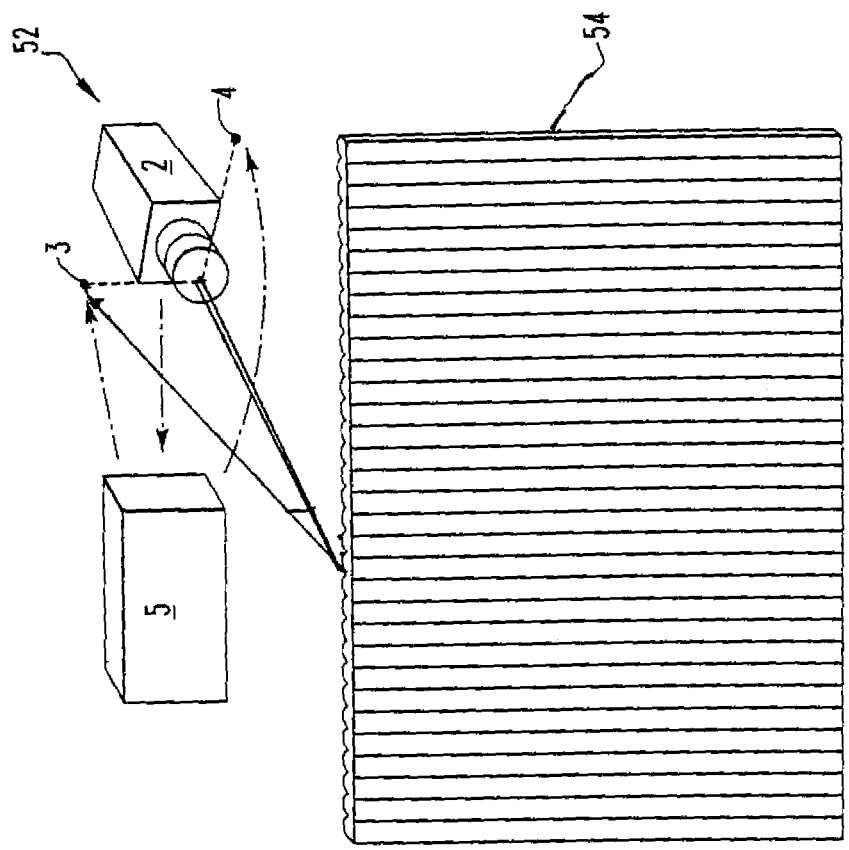
FIG. 5 shows the physical components of an input-only embodiment of the present invention.

Referring now to the drawings wherein like reference numerals refer to similar or identical parts throughout the several views, and more specifically to FIG. 5 thereof, there is shown a detection apparatus 50. The apparatus 50 comprises a multilocation sensor 52. The apparatus 50 comprises a sheet 54 in communication with the sensor 52, which when a plurality of locations of the sheet 54 are simultaneously activated, the sensor 52 senses these locations, simultaneously or approximately simultaneously (e.g., the sensing may have some sequential operations such as taking/scanning a picture and processing the picture to sense and identify the multiple locations).

Preferably, the multilocation sensor 52, when the plurality of locations of the sheets 54 surface are touched simultaneously, the sensor 52 senses these locations, simultaneously. The sensor 52 preferably includes an imager which produces images of the surface. Preferably, the imager includes a camera 2 and the sensor 52 includes a computer 5 in communication with the camera 2 and receives the images from the camera 2. The sheet 54 preferably includes a first lenslet array. Preferably, the surface is at the focal length of each lens of the lenslet array. The array preferably has a smooth side and a ridged side, and the array is positioned so the ridged side is facing the camera 2. Preferably, the array has lateral spacing between the lenses to allow the sheet 54 to be looked through. Preferably, the camera 2 includes a shutter to reduce optical noise.

Figure 7:
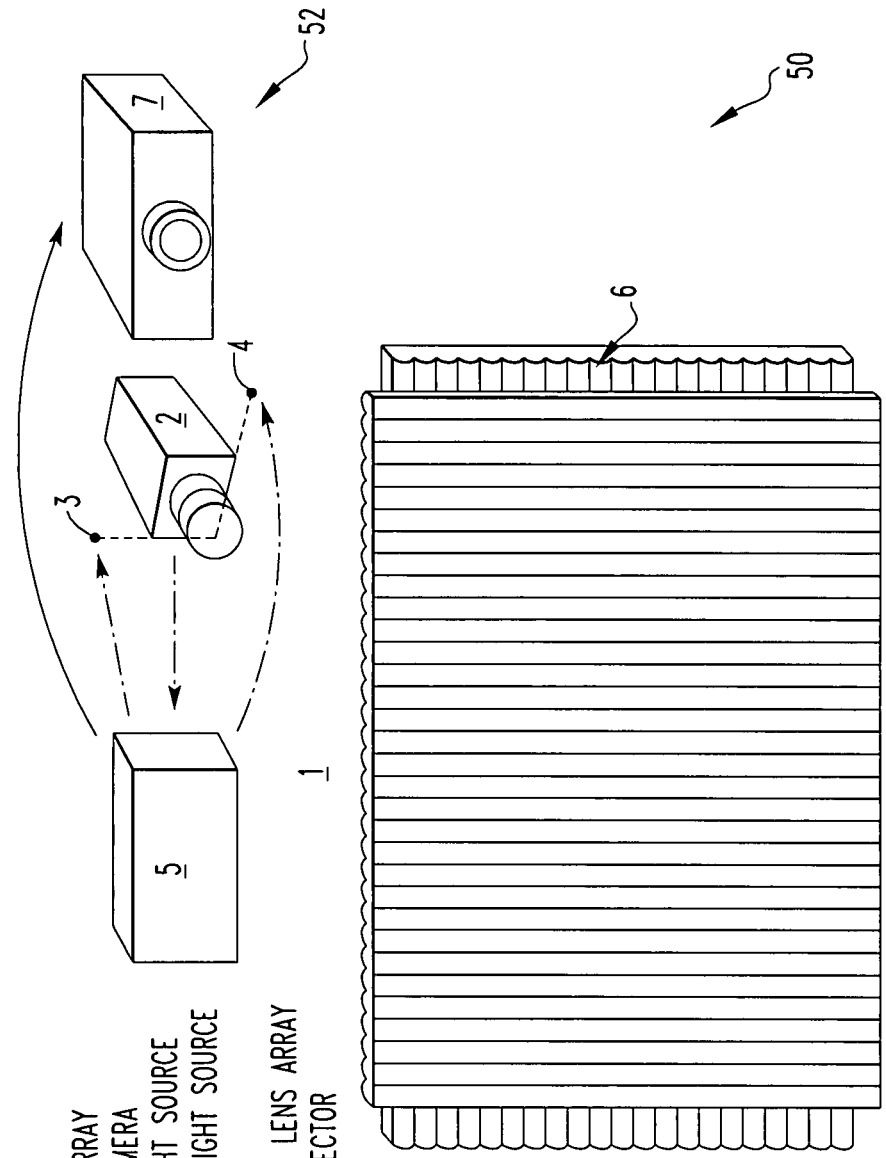
FIG. 7 shows the physical components of the input-output embodiment of the present invention that is compatible with a rear projection display.

Alternatively, the apparatus 50 can include a second lenslet array, as shown in FIG. 7. The second lenslet array can be oriented perpendicular to the first lenslet array, and together the first and second lenslet arrays act as a rear projector screen. The apparatus 50 can include a projector in communication with the computer 5 that displays an image generated by the computer 5.

Alternatively, the surface is a thin-film comprising micro lenses. The micro lenses can be sparsely placed so the surface appears transparent. The sheet 54 can include a substrate and both sides of the substrate are coated with thin films comprising micro lenses. "Sparsely" means small enough so that there is a usefully large flat area between the lenslets for an observer to look through the surface as though it were a clear pane of glass. In this context, it can mean as large as ½ of total surface area, or as small as ¹⁄₁₀₀ of total surface area.

The sensor 52 preferably uses retroreflection to determine the locations. The sensor 52 can use touch, pressure, or proximity to determine the locations.

The apparatus 50 can include a first light source 3 and a second light source 4, and the computer 5 subtracts pixel values from a second image formed when the second light source 4 is on from corresponding pixel values of a first image formed when the first light source 3 is on.

The present invention pertains to a detection apparatus 50. The apparatus 50 comprises a surface. The apparatus 50 comprises a sensor 52 in communication with the surface that detects variable pressure regarding a touch on the surface.

The present invention pertains to a detection apparatus 50. The apparatus 50 comprises a surface. The apparatus 50 comprises a sensor 52 in communication with the surface that is capable of detecting a touch on a surface and also a presence of an object near the surface but not touching the surface.

The present invention pertains to a detection apparatus 50. The apparatus 50 comprises a lenslet array where the lenslets are diffractive. The apparatus 50 comprises a sensor 52 for determining where the array is being touched. The sensor 52 includes a first light source producing light at a first frequency, a second light source producing light at a second frequency, a camera 2 which records images from the frequencies of light from the array, and a computer 5 which determines where the surface is being touched from the images.

The present invention pertains to a detection apparatus 50. The apparatus 50 comprises a surface. The apparatus 50 comprises a sensor 52 for determining where the surface is being touched, including a plurality of cameras 2 that take images of the surface, a first array of lights positioned such that light from the first array is on a vertical line with one or more of the cameras 2, a second array of lights that are positioned such that light from the second array is on a horizontal line with one or more of the cameras 2 and a computer 5 connected to the cameras 2 which determines where the surface is being touched from the images. In regard to a shorter throw distance, it is meant specifically:
the use of N cameras across the width of the screen (where N is greater than one) results in a throw
distance of 1/N with respect to the throw distance required when using only a single camera.

The present invention pertains to a detection apparatus 50. The apparatus 50 comprises a sheet 54 containing a plurality of elements which are at least one of refractive, diffractive, retroreflective, reflective, or focusing. The apparatus 50 comprises a sensor 52 which determines where the sheet 54 is touched based on light being one of refracted, diffracted, retroreflected, reflected or focused by the sheet 54 to the sensor 52. For example, focusing can be either by refraction or by diffraction.

The present invention pertains to a detection apparatus 50. The apparatus 50 comprises a sheet 54 having no active components in, on, or adjoining the sheet 54. The apparatus 50 comprises active components separate and apart from the sheet 54 which determine where the sheet 54 is touched.

The present invention pertains to a method for detection. The method comprises the steps of activating simultaneously a plurality of locations of a sheet 54. There is the step of sensing these locations simultaneously with a multilocation sensor 52 in communication with the sheet 54. The sensing step can include the step of subtracting pixel values of a second image from corresponding pixel values of a first image.

The present invention pertains to a method for detection. The method comprises the steps of touching a surface. There is the step of detecting variable pressure regarding the touch on the surface.

The present invention pertains to a method for detection. The method comprises the steps of detecting a touch on a surface with a sensor 52 in communication with the surface. There is the step of detecting a presence of an object near the surface but not touching the surface with the sensor 52.

The present invention pertains to a method for detection. The method comprises the steps of determining where a surface is being touched with a sensor 52 by taking images of the surface with a plurality of cameras 2, where a first array of lights is positioned such that light from the first array is on a vertical line with one or more of the cameras 2, and a second array of lights is positioned such that light from the second array is on a horizontal line with one or more of the cameras 2. There is the step of determining with a computer 5 connected to the cameras 2 where the surface is being touched from the images. It should be noted that vertical and horizontal as used herein is relative, with the essence that these two directions are 90 degrees relative to each other.

The present invention pertains to a method for detection. The method comprises the steps of touching a sheet 54 containing a plurality of elements which are at least one of refractive, diffractive, retroreflective, reflective or focusing. There is the step of determining with a sensor 52 where the sheet 54 is touched based on light being one of refracted, diffractive, (retro)reflected or focused by the sheet 54 to the sensor 52.

The present invention pertains to a method for detection. The method comprises the steps of touching a sheet 54 having no active components in, on, or adjoining the sheet 54. There is the step of determining where the sheet 54 is touched with active components separate and apart from the sheet 54.

The present invention pertains to a detection apparatus 50. The apparatus 50 comprises an autostereo display including a multitouch retroreflective surface and a projector.

The present invention pertains to a detection apparatus 50. The apparatus 50 comprises a multilocation sensor 52. The apparatus 50 comprises a sheet 54 having a first side and a second side in communication with the sensor 52, which when a location of the sheet 54 is activated on the first side and the second side, the sensor 52 senses the locations. Preferably, simultaneous activation of locations on the first side and the second side can be detected independently by the sensor 52.

The present invention pertains to a software program stored on a computer 5 readable medium. The program comprises the steps of activating simultaneously a plurality of locations of a sheet 54. There is the step of sensing these locations simultaneously with a multilocation sensor 52 in communication with the sheet 54. Preferably, there is the step of measuring an area on contact of these locations.

In the operation of the invention, in order to properly explain the embodiment of the invention, it is helpful to first explain the underlying principle of its operation.

A lenticular lens sheet 54 becomes retroreflective where it is touched upon its flat face. This phenomenon occurs because light that arrives at the sheet 54 from any direction will be focused by each lenticular lens into a thin bright line of light upon the far (smooth) face of the lenticular lens array 1. In this fashion, the light is concentrated into thin bright parallel stripes of light upon the smooth far face of the lenticular lens sheet 54. Normally, this light would then continue onward, emerging out of the other side of the sheet 54, where it diverges to form a diffuse light.

However, if a diffusely reflective object, such as a human finger or hand, touches the smooth side of the lenticular lens sheet 54, then the surface of this object will be illuminated by these thin stripes of light. This concentrated light will then be reflected diffusely back through the lenticular lens sheet 54. Because this reflected light is contained within a line of focus of the lenslet that it came through, most of the reflected light will travel back again through the same lenslet, becoming linearly columnated by this lenslet into a thin parallel plane of light (the remainder of the reflected light passes mainly through the neighboring lenslets). Any light sensor 52 which is contained within this plane will receive a much greater proportion of reflected light than any light sensor 52 that is not contained within this plane.

Figure 1A:
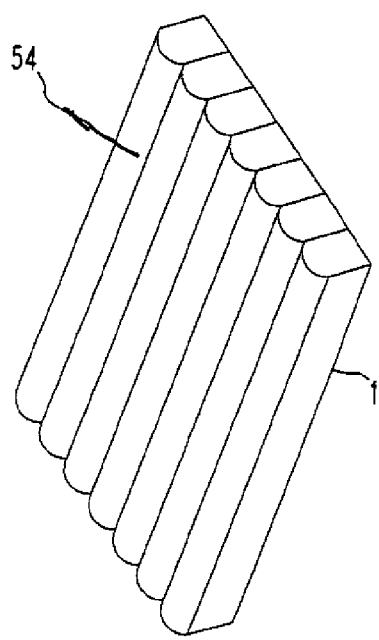
FIGS. 1A and 1B show how light is first concentrated and then diffused by a lenticular lens sheet.
Figure 1B:
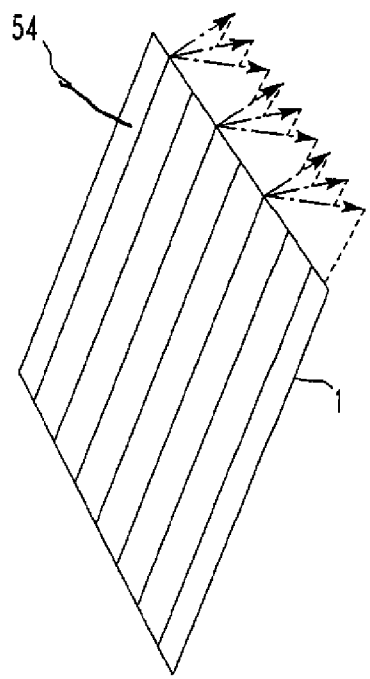

FIGS. 1*a* and 1*b* show how light is first concentrated and then diffused by a lenticular lens sheet 54. FIG. 1*a* shows a lenticular lens array 1. FIG. 1*b* shows the way that light that enters from a single point source to the left concentrates into thin parallel lines when it reaches the rear surface of the lenticular lens sheet 54, after which the light fans out horizontally as it exits through the rear of the lens sheet 54.

Figure 2:
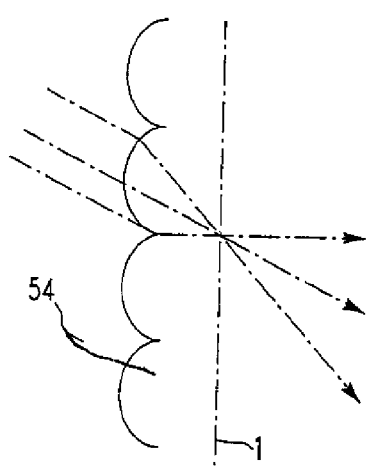
FIG. 2 shows how light is first concentrated and then diffused for a single lenslet, shown in profile.

In FIG. 2, this same effect is shown for a single lenslet, seen in profile. Note in particular that collimated parallel light that enters the lenslet is converted into uncollimated divergent light upon exiting the other side of the sheet 54. In this way, the lenslet sheet 54 acts as an optical diffuser.

Figure 3:
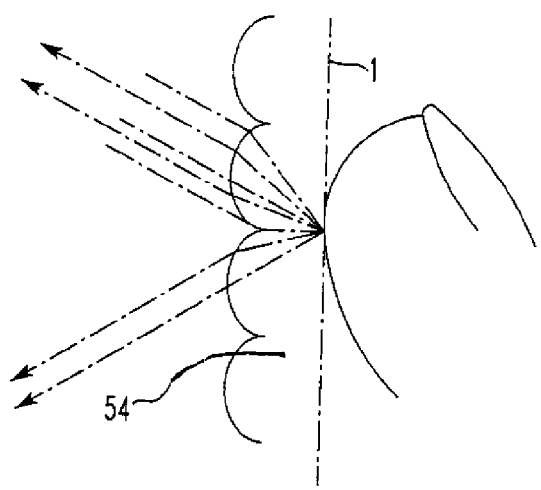
FIG. 3 shows the effect of a human finger coming into contact with the smooth face of the lenslet array.

FIG. 3 shows the effect of a human finger coming into contact with the smooth face of the lenslet array. The result of this touch is collimated retroreflection of the incoming light back toward its source. In the diagram, thick lines represent light that comes from the light source, and thin lines represent light that is reflected back from the finger which is touching the far surface of the lenslet array. Observe that most of the light that is scattered off the finger returns to the same lenslet from which it arrives, and thereby travels directly back toward the source of illumination. Effectively, the portion of the lenslet surface which is being touched becomes a planar retroreflector: retroreflective in any plane that is perpendicular to the lenticular direction.

At the same time, objects which are not touching the surface are only visible because light which has already diverged to become diffuse on the far side of the lenticular lens sheet 54 is reflected back through the sheet 54. For such objects, the amount of reflected light seen by the image sensor 52 in phase A and in phase B will be substantially the same.

Figure 4:
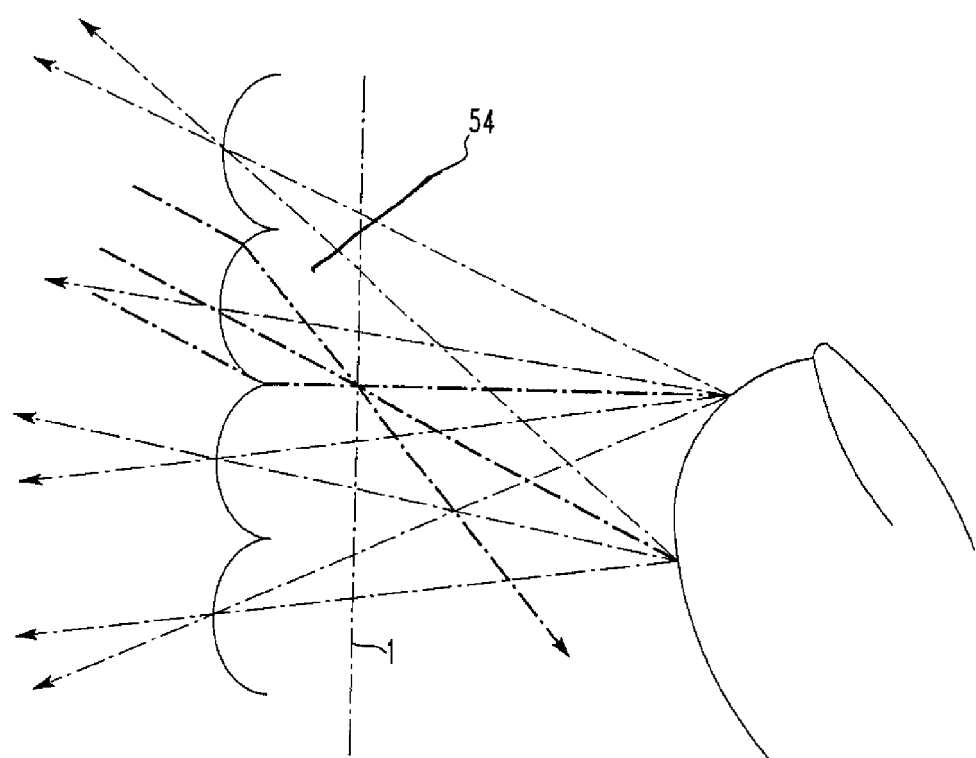
FIG. 4 shows the retroreflective property of the lenslet array.

In FIG. 4, this retroreflective property is shown as follows: Thick lines represent light that comes from the light source. Thin lines represent light that is reflected back from the finger which is at a distance from the far surface of the lenslet array. Observe that some of the light from the lenslet misses the finger entirely. Of the light that reaches the finger, reflected light passes through many different lenslet arrays, into many different return directions. In this case, the surface is not acting as a planar retroreflector.

Two successive embodiments are described. The first, simpler, embodiment functions only as a multitouch sensing device. The second, more complex, embodiment functions as a multitouch sensing device that can be used in conjunction with rear projection display.

THE PHYSICAL COMPONENTS OF THE INPUT-ONLY EMBODIMENT

1. Lenticular Lens array
2. Infrared Video camera
3. First infrared light source
4. Second infrared light source
5. Computer FIG. 5 shows all the components in this embodiment. Note that in this diagram, the lenticular lens array 1 is placed so that its ridged side is facing toward the video camera 2, and its smooth side is facing away from the video camera 2. It is this smooth side (the side facing away from the video camera 2 that will form the multitouch surface.

The first infrared light source 3 is placed such that the line in space between this light source and the aperture of the video camera 2 is parallel to the line in space formed by each individual lenticular lenslet in the lenslet array. In the diagram this line is vertical, but an embodiment in which this line is horizontal would work equally well.

The second infrared light source 4 is placed such that the line in space between this light source and the aperture of the video camera 2 is roughly perpendicular to the line in space formed by each individual lenticular lenslet in the lenslet array.

The arrows in the diagram show the flow of digital information through the system. Images flow from the infrared digital video camera 2 to the computer 5. Meanwhile, digital signals to light up in succession flow from the computer 5 to the first infrared light source 3 and second infrared light source 4.

The Step-by-Step Internal Operation of the Input-Only Embodiment:

The Internal Operation is as Follows:
- computer 5 turns on only the first IR light, and the computer 5 then captures this image from the video camera 2 (capture phase a)
- computer 5 turns on only the second IR light, and the computer 5 then captures this image from the video camera 2 (capture phase b)
- computer 5 subtracts the pixel values of the second image from the corresponding pixels values of the first image The computer 5 controls the timing of the two infrared light sources 3 and 4 into two successive phases, an A phase and a B phase. The computer 5 also reads the output from the video camera 2 and processes this output. The result of this processing is the determination, at successive moments in time, of which points on the smooth surface of the lenticular lens array 1 are being touched by a user. When the A and B capture phases have both been completed, the cycle is then repeated. The sequence of image data from these successive cycles create a time-varying multi-touch data stream that can then be used by computer software applications as desired.

The key operating principle is as follows: because the first light source is displaced from the camera 2 aperture along a line in space that is parallel to the line of each lenticular lenslet, a very high proportion of this light will return to the camera 2 aperture.

Because the A phase places a light source and image capture device in the same focal plane of the lenticular lenses, whereas the B phase places a light source and image capture device in different focal planes of the lenticular lenses, objects which are physically touching the smooth (far) surface of the lenticular lens array 1 will produce a much brighter image in phase A than in phase B.

For this reason, the operation of subtracting the image that was captured in phase B from the image that was captured in phase A will remove almost all of that portion of the image which is due to light that has been reflected back from objects not touching the far surface of the lenslet sheet 54, leaving only the image of light formed by objects touching the far surface of the lenslet sheet 54.

Figure 6:
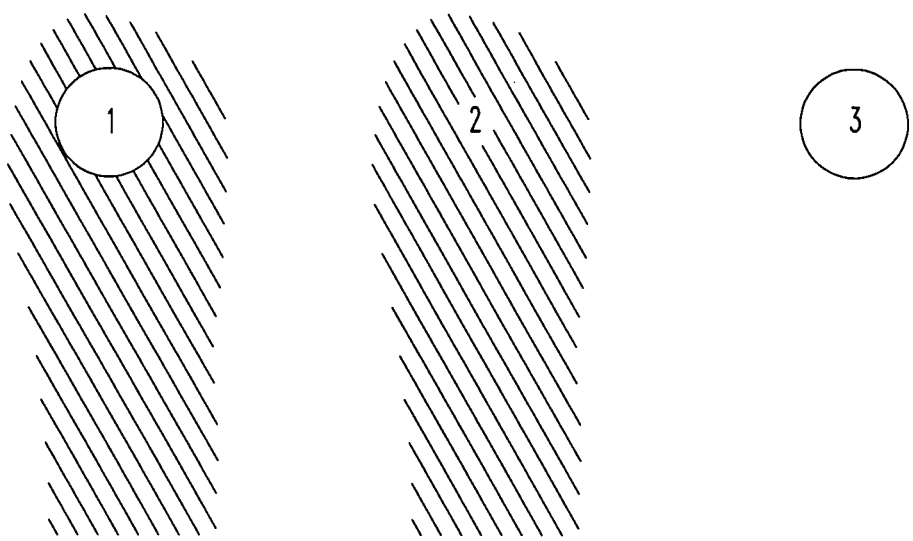
FIG. 6 is a representation of three successive images obtained with the embodiment of FIG. 5.

FIG. 6 is a stylized representation of three successive images. The left-most image (1) represents an image capture using the first light source. Sections that appear cross-hatched represent the diffuse reflected image of a human finger which hovers near the surface but does not touch it. The thick-lined circle represents the very bright hard-edged region within this image where a portion of the user's finger is physically touching the surface. The center image (2) represents an image capture using the second light source. In this case, the portion of the user's finger that is touching the surface does not produce a significantly brighter reflection than the portion that hovers near the surface without touching it. The right-most image (3) represents the subtraction of image (2) from image (1). The result is an image that indicates which regions of the surface are being physically touched by the user.

It is also possible to operate the diffuse using on an A phase, and no B phase. But in this simplified embodiment, the signal to noise ratio of the captured touch data image will be much lower than in the case of the two phase method. This lower signal to noise ratio may be disadvantageous for use in some applications.

THE INPUT-OUTPUT EMBODIMENT

1. Lenticular Lens array
2. Infrared Video camera
3. First infrared light source
4. Second Infrared Light Source
5. Computer
6. Second lenticular lens array
7. Digital Image Projector FIG. 7 shows all the components in the embodiment that is compatible with rear projection display. In this configuration, a second lenticular lens array 6 and a digital image projector 7 are added. The two lenslet arrays 1 and 6 are oriented perpendicular to one another. In one embodiment, the lenslets of the first lens array 1 are oriented horizontally, and the lenslets of the second lens array are oriented vertically. The second lenslet array 6 is placed on the ridged side of the first lenslet array 1, which is the side that is away from the user of the system. The digital projector is also placed on the side that is away from the user of the system, so that it functions as a rear projector. The first lenticular lenslet array 1 serves to horizontally scatter the light from the projector 7, and the second lenticular lenslet array 6 serves to vertically scatter the light from the projector. When thus used in tandem, the two lenticular lenslet arrays function as a rear projection screen.

The arrows in the diagram show the flow of digital information through the system. Images flow from the infrared digital video camera 2 to the computer 5. Meanwhile, digital signals to light up in succession flow from the computer 5 to the first infrared light source 3 and second infrared light source 4. The image from the computer 5 is generated by the digital image projector 7.

Because the user cannot touch the second lenticular lenslet array 6, this second lenslet array does not have any retrore-flective properties within the system—it serves only to scatter light from the rear projection in the direction perpendicular to the direction that light is scattered by the first lenticular lenslet array 1, thereby completing the functionality of a rear projection display system with multitouch capability.

Detection of Variable Pressure:

Even an extremely light touch upon the surface will produce a retroreflective effect. However, when a user's finger touches the surface very lightly, only a small area of the fingertip is in contact with the surface. In contrast, as the user presses more firmly against the surface, the soft pad of the user's fingertip flattens, causing an increase in the area of the fingertip that comes into contact with the surface. The current invention includes the step of measuring, in computer software, the area of contact of the small round shape that appears in the captured image as a consequence of a user's finger touching the surface. By the simple mechanism of counting the number of pixels contained in this shape, the pressure of the user's touch upon the surface can be measured. This measurement can be performed independently and simultaneously for all of the fingers that are touching the surface.

Figure 8:
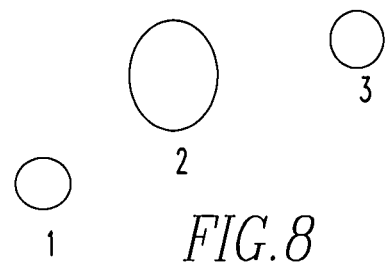
FIG. 8 represents the image, as it would be captured by the digital camera and subsequently transferred to the computer for processing, of three human fingers touching the multitouch surface of the present invention.

FIG. 8 represents the image, as it would be captured by the digital camera 2 and subsequently transferred to the computer 5 for processing, of three human fingers touching the multi-touch surface. For visual clarity this diagram shows only the outlines of the blobs, rather than an actual image of white shapes against a black background. The fingers are labeled, respectively, (1), (2) and (3). The middle finger (2) is pressing more firmly than the first finger (1) or the third finger (3). Consequently, finger (2) appears as a blob that contains a greater number of image pixels than do the blobs that represent the other two fingers. After counting the number of pixels within each blob, the computer 5 support software is able to transmit to application programs a pressure measurement for each finger.

Detection of Hovering and Proximity:

Some multitouch enablements, such as the Frustrated Total Internal Reflectance method used by Han, J., *Bi-manual, multi-point, and multi-user interactions on a graphical interaction surface*. web publication: http://mrl.nyu.edu/~jhan/ft-irtouch/, incorporated by reference herein, as well as capacitance array based methods (Lee, S. K., Buxton, W. and Smith, K. C., *A Multi-Touch Three Dimensional Touch-Sensitive Tablet* in Proceedings of CHI '85 (April 1985), ACM/SIGCHI, NY, 1985, pp. 21-25, incorporated by reference herein), do not sense the presence of a finger which hovers over the surface but does not physically touch it. This limitation restricts the utility of these enablements, since there is no way for the detector to know when successive touches upon the surface are by the same finger or by different fingers, or even whether successive touches are by the same person.

In contrast, the optical retroreflection-based multitouch sensor 52 produces two images: (i) the primary image of bright sharply defined areas where the hand comes into contact with the surface, and (ii) a secondary image which is defocused and less bright, indicating where the hand is hovering near the surface (and therefore scatters infrared light back to the surface diffusely), but not actually touching the surface.

The shapes found in this second image can be tracked in software, and standard shape recognition software can be used to segment and identify a left hand or right hand shape as it moves across the surface between touches. In this way, it is possible for the device to detect the difference between events that it would be useful for applications to differentiate. Such events could include, as representative examples: (i) successive or repeated touches upon the surface by the same finger, (ii) successive touches by different fingers (such as a touch by the index finger followed by a touch by the middle finger), or (iii) successive or simultaneous touches by the fingers of two different hands.

Figure 9:
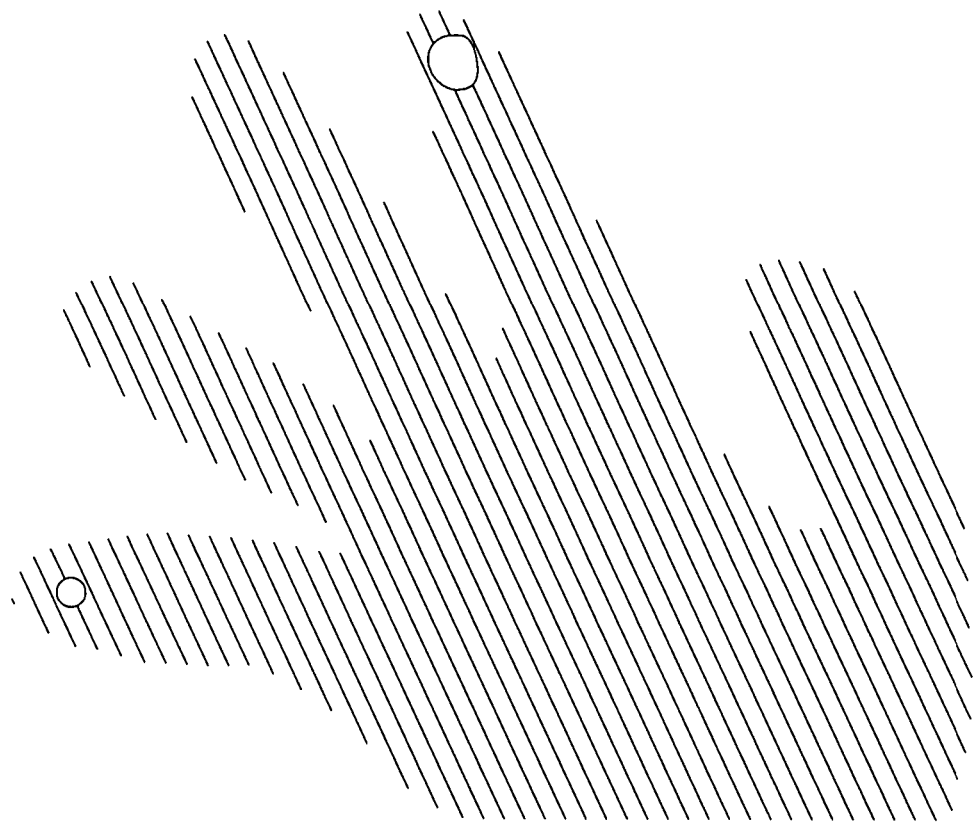
FIG. 9 shows the light the camera receives from those areas where the hand is hovering near the surface but not physically touching it, with the hatched areas representing the soft low intensity regions of brightness that the camera receives of the present invention.

In FIG. 9, the hatched areas represent the soft low intensity regions of brightness that the camera receives from those areas where the hand is hovering near the surface but not physically touching it. The large and small ovals represent the sharp high intensity regions of brightness that the camera 2 receives from those areas where the hand is physically touching the surface (pressing down in the case of the large oval; lightly touching in the case of the second oval).

From this information, standard computer vision segmenting algorithms are able to determine that the user is pressing forcefully upon the surface the index finger of the left hand while simultaneously lightly touching the surface with the little finger of the left hand.

Figure 10:
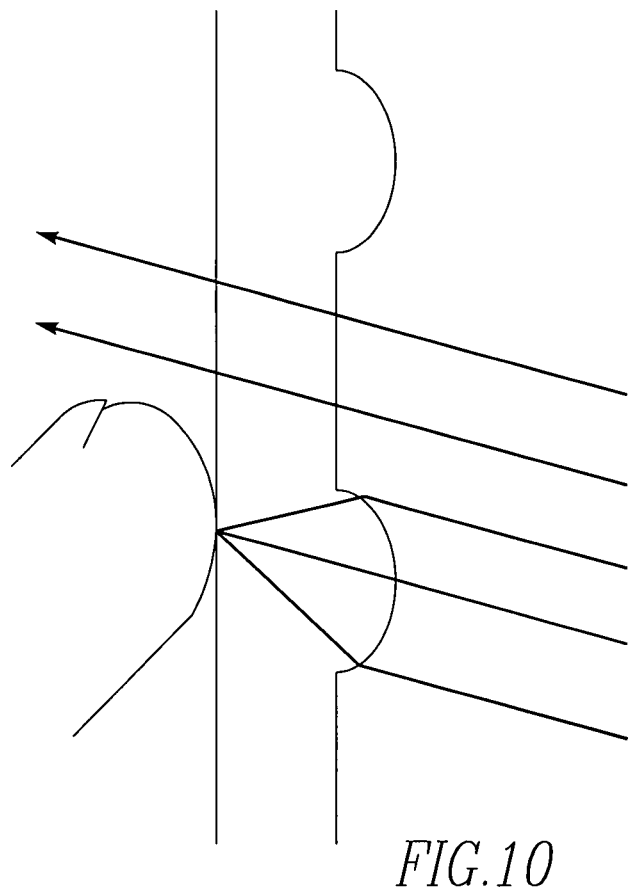
FIG. 10 shows a cross-section through a surface that contains lateral spacing between the lenses.

Design Variations:

Spacing Between the Lenses to Allow for a Transparent Surface:

There can be lateral spacing between the lenses. This allows the surface to be transparent, like a window pane, while also serving as a retroreflective surface when touched. This is useful for applications, such as a touch-responsive window into a room, that require the user of the system to visually observe something on the other side of the touch surface. FIG. 10 shows a cross-section through a surface that contains such spacing. Where the surface is flat (1) it functions as an ordinary transparent window. Where the surface contains lenslets (2) it functions as a retroreflective touch sensor 52—and potentially also as a light-scattering element for rear projection.

Reducing Interference from Ambient Light Sources Through Shutter Timing:

The environment in which the device operates will have some degree of uncontrollable ambient light, which can create optical noise that interferes with measurement. To reduce the effect of this optical noise, the invention can make use of an fast-acting shutter on the digital camera 2, such as an electronic shutter. One extant example of an electronic shutter capable of very rapid operation is a ferroelectric liquid crystal (FLC) shutter. An FLC shutter can switch between opaque and transparent in a few microseconds. The shutter is only kept open (transparent) during a small window of time, and is kept closed (opaque) at other times. The First Light Source and Second Light Source are illuminated only during times when this shutter is open. Because light emitting diodes are capable of flashing for extremely short bursts of time, the use of this mechanism greatly reduces interference from unwanted ambient sources of light.

Figure 11:
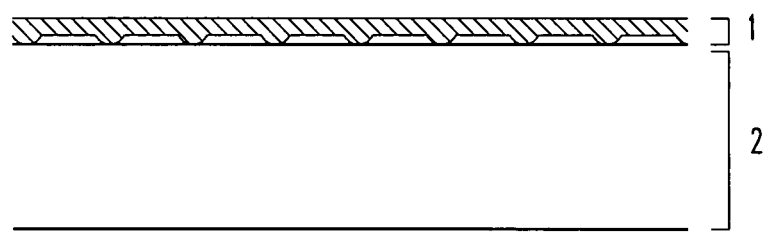
FIG. 11 shows an embossed film mounted onto a thicker glass or clear plastic substrate for mechanical support.

Micro-Lenslets, Either Refractive or Diffractive:

The multi-touch sensitive surface can also be a thin film containing very small micro-lenses as the light-focusing lenslets, where each lenslet can be on the order of $\frac{1}{100}$ inch in width or less. These lenslets can be either refractive or diffractive. In either case, the film can be manufactured through the process of hot-rolled embossing, a method that is currently in widespread industrial use for creating thin films with finely embossed surfaces. As is illustrated in FIG. 11, the embossed film (1) would be mounted onto a thicker glass or clear plastic substrate (2) for mechanical support. The film is placed on the side of the substrate that is to be touched by the user, and oriented so that the bumpy side of the thin film is facing the substrate.

Sparse Microlenses to Create a Window that is Multitouch on Both Sides:

These microlenses can be sparsely placed, so that the surface can appear transparent, like a window pane. If the microlenses are sparsely placed, then the thick glass or plastic substrate can be coated on both faces by such a thin film. In this way the surface can be used from either side: A user can stand on either side of what appears to be a clear transparent vertically mounted surface. The sparse microlenses provide a sufficient scattering effect so that a rear projector can create an image upon the surface, in the same way that a deposit of fine dust upon a glass surface can scatter light sufficiently for a projector to form an image. A complete system consisting of rear-mounted camera with structured lights and optional projector can be deployed on both sides of the glass, and the user can use the system from either side. Touches on the two sides of the glass can be detected independently.

When used in this fashion, it is important to angle the projectors and cameras 2 with respect to the two-sided multitouch surface, to minimize the degree to which the user who is in front of one side blocks the line of site between the surface and the projector and camera 2 which are on that side (i.e., the components that are used to enable the user on the other side of the surface to see images and to register touch events upon the surface).

Figure 12:
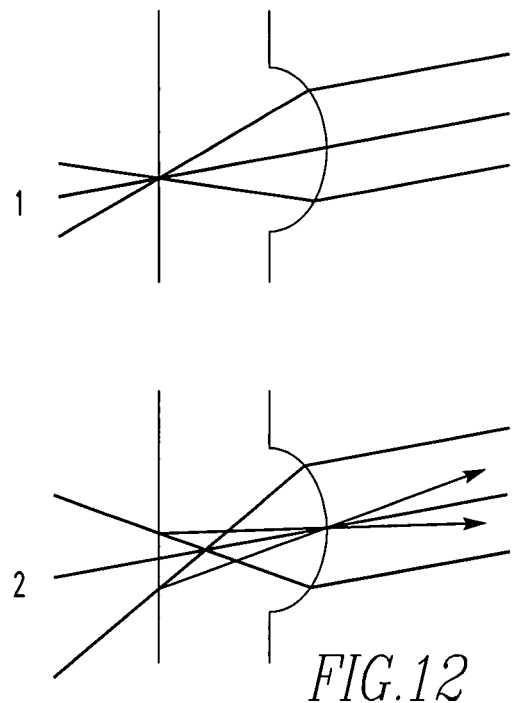
FIG. 12 shows that, when a side of the screen facing a user is physically touched, the portion of light that is at one frequency has a focus that lies on the far surface, while for the other frequency, the focal point does not lie on the far surface.

Use of Diffractive Lenslets with Multiple Frequencies of Light:

If the lenslets are diffractive, then the retroreflective quality is highly sensitive to light wavelength. This quality can be used to enhance the signal to noise ratio. In one embodiment, the device employs two different light sources of differing frequencies. For one of these frequencies, each diffractive lenslet on the surface of the screen facing the camera/light subsystem focuses light onto a point at the far surface of the screen (the side facing the user). As shown in FIG. 12, when the side of the screen that faces the user is physically touched, the portion of this light that is at one frequency has a focus that lies on the far surface 1. Therefore the focused light scattered back from a user's touch will return back through the same lenslet, and then retroreflectively back to its source, as previously described. For the other frequency, the focal point does not lie on the far surface 2. Therefore, when the surface is physically touched, light having this second frequency is scattered back diffusely. The camera 2 can record these two frequencies of light simultaneously as two color components, and the computer 5 can perform a difference operation between the two component images to determine where the surface is being touched, as previously described.

Figure 13:
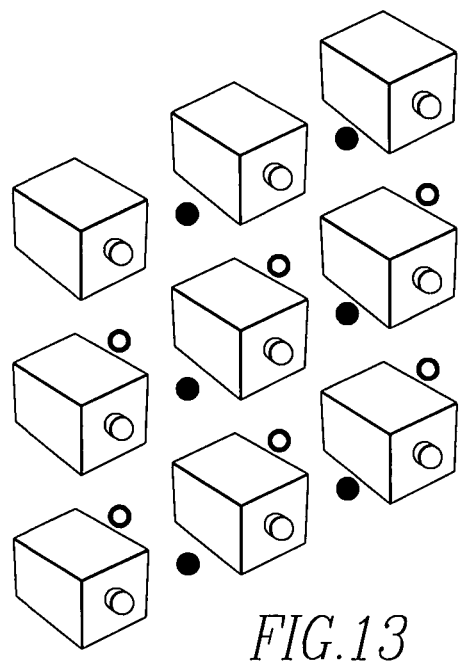
FIG. 13 shows multiple low resolution cameras facing a screen (not shown).

Use of a Tiling Arrangement of Multiple Cameras 2:

The camera 2 and lights can be tiled over the surface: rather than using a single camera 2, multiple lower resolution cameras 2 can be used. This arrangement permits a shorter throw distance behind the touch-sensitive surface, which allows the mechanism to be more compact in depth. In FIG. 13, multiple low resolution cameras 2 face the screen (the screen itself is not shown in this figure). The first light source is replicated into an array of lights (each shown in the diagram as a small circle) that are positioned such that light is on a vertical line with one or more of the cameras 2. The second light source is replicated into an array of lights (each shown in the diagram as a black dot) that are positioned such that light is on a horizontal line with one or more of the cameras 2. In embodiment of a tiling arrangement that is illustrated in the diagram, multiple cameras 2 in the camera 2 array can share the effects of illumination by multiple lights.

The lenslet surface array itself can also be made of a seamless tiling of smaller sheets 54. Note that this capability is not afforded by previous techniques that require active components at the edge of the touch surface, such as the FTIR based method employed by Han, J., *Bi-manual, multi-point, and multi-user interactions on a graphical interaction surface*. web publication: http://mrl.nyu.edu/~jhan/ftirtouch/, incorporated by reference herein. This ability to tile allows the lenslet surface to be made in small sizes while allowing the multitouch device to cover a very large area, without incurring the large manufacturing and shipping costs that would otherwise be incurred to employ a single extremely large lenslet sheet 54.

A principle of the apparatus 50 is based upon the fact that lens arrays become retroreflective when you touch them on their smooth side, because the light that comes from any direction is focused and thereby concentrated when it gets to that face, and then gets largely scattered back through the same lenslet, and from there back to the source.

Fly's eye version: The principle also works with two dimensional lens arrays (i.e.: fly's eye arrays). In that case, the light is concentrated down to a point, rather than to a line. In a fly's eye embodiment, the first infrared light source 3 should be in the same direction as the infrared camera 2. This can be done either by positioning the Infrared Light Source very near to the lens of the camera 2, or else through the use of a half-silvered 45 degree mirror to align light and camera 2 along the same optical path. In the fly's eye embodiment the Second infrared light source 4 simply needs to be positioned almost anywhere else, so that light from that source enters the lens array from a direction which is not coincident with the camera 2 direction. Also, in this embodiment it is not necessary to employ a second lens array in order to create a display subsystem, since a fly's eye lens array also functions well, by itself, as a rear projection display surface.

Thickness of the sheet 54 should be focal length of the lenslet: The surface that the user touches should be at the focal length of the lens. This is generally true of commercially available lenticular lenslet arrays that are used for stereo 3D posters. Such lenticular lenslet arrays are relatively inexpensive to obtain, available in large sizes and low expense, because they are manufactured in large quantities for use in such posters.

Fly's eye lenses are good but expensive: In contrast, fly's eye lens arrays are rather expensive, because there is no commercial use for fly's eye lens arrays that require large quantities. For this reason, even though the fly's eye embodiment can achieve a much higher signal to noise ratio than a lenticular array embodiment, it is likely that the lenticular array embodiment will be more practical and commercially viable in the marketplace.

Short focal length is important: Note that it is important that the lens have a relatively low f-number (the f-number is the ratio of a lens's focal length to diameter), in order that a relatively large proportion of the scattered light at the focal point will return through the same lens. The shorter the focal length, the more effective is the retroreflective effect.

Active surface does not need to be flat: Note that there is no requirement that the multitouch surface be flat. It can also be curved. The only requirement is that the infrared video camera 2 be able to focus well enough upon the surface to form an image.

A note about the use of infrared: There is nothing in the technique that requires the use of infrared, as opposed to, say visible or ultraviolet light. Infrared (near infrared in particular, which is close to the visible spectrum) is often used for vision based tracking systems because people can't see it, and so the entire subsystem can be made independent of the display subsystem. Generally, the infrared video camera 2 is fitted with a filter that blocks visible light from entering, and conversely, the display projector is fitted with a filter that blocks it from emitting infrared light.

Use of video capture on alternating fields: The alternation between phase A and phase B could be handled inexpensively by synchronizing the two light sources as Infrared LEDs and employing a video camera 2 that captures images on "fields" (which is a standard and inexpensively available method for video capture). A video camera 2 that captures on fields first captures all the odd scan lines in 1/60 of a second, and then captures all the even scan lines 1/60 of a second later. So from a practical perspective, using the phase A/phase B method described above could simply consist of syncing the LED flashes to the odd and even fields of the video camera 2, respectively, and then subtracting the even scanlines from the odd scanlines of the captured video image.

Angling the camera 2 to remove glare: There is a potential problem with the glare from the LED shining directly off the face of the lenticular lenslet array screen. This can be readily handled by angling the video camera 2 (and the two LED light sources) at an oblique angle with respect to the lenticular lenslet screen, to that any reflective glare is not visible from the camera 2.

Using cross polarization to remove glare: Another way to solve this glare problem is use polarized light as the light source, and then to use the opposite polarization on the camera 2. This will ensure that no appreciable direct reflection of the light is visible from the camera 2. Because the finger of the person touching the surface is a diffuse reflector, the retroreflective signal will be visible, since diffuse reflection does not preserve polarization. Using polarization allows the camera 2 to be less oblique in its view of the screen. This creates less distortion and consequently higher resolution than a method that relies on placing the camera 2 at an oblique angle to avoid glare.

Compatibility with Autostereoscopic Displays

Figure 14:
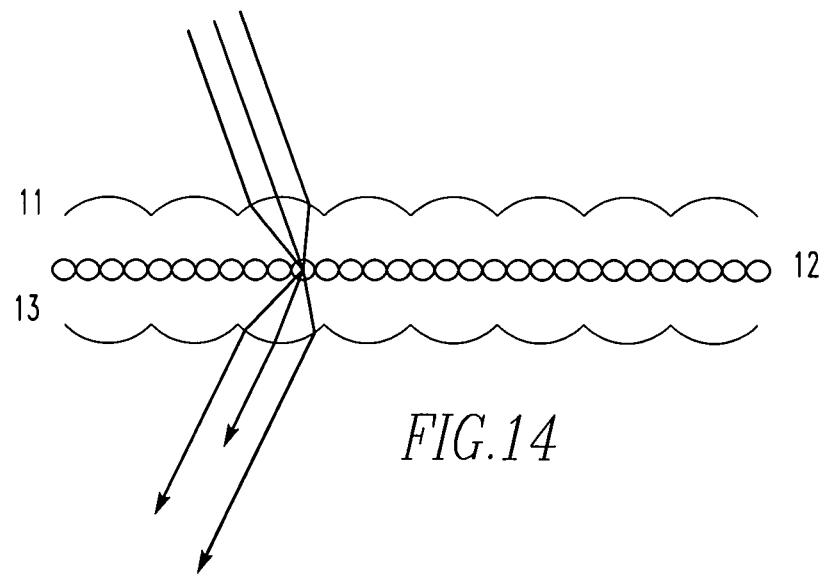
FIG. 14 shows light that originated in a single projector entering a lenslet.

Autostereoscopic displays are visual image displays that produce a sensation of left/right stereoscopic disparity, without requiring their user to wear special eyewear. The predominant mechanism to support such displays involves the use of vertical lenticular lenslet arrays in the projection screen. One type of display that makes use of rear projection (Matusik, W.; Pfister, H., "3D TV: A Scalable System for Real-Time Acquisition, Transmission and Autostereoscopic Display of Dynamic Scenes", ACM Transactions on Graphics (TOG) SIGGRAPH, ISSN: 0730-0301, Vol. 23, Issue 3, pp. 814-824, August 2004 (ACM Press, TR2004-067, incorporated by reference herein) uses a rear projection screen. FIG. 14 shows a cross-sectional view from above. The screen consists of a sandwich of a first vertical lenticular lenslet array 11, a diffuser screen 12, and a second vertical lenticular lenslet array 13.

A number of digital projectors are arrayed behind the screen such that each projector has a unique horizontal offset with respect to all the other projectors. Because of this offset, the light from each projector will be focused by each lenslet of the first vertical lenslet array 11 onto a slightly different horizontal position on the diffuser screen 12. This slight difference in position causes the light that has originated in different projectors to enter the second vertical lenticular lenslet array 13 from different horizontal directions. The lenslets of the second vertical lenticular lenslet array therefore relay these different images out into different collimated directions. The resulting three dimensional lightfield allows an image with stereoscopic disparity to be seen from many observer positions.

In FIG. 14, light that originated in a single projector is shown entering a lenslet. Because the light comes in at a single horizontal angular direction, the autostereoscopic screen sends this light out into a single horizontal angular direction.

Figure 15:
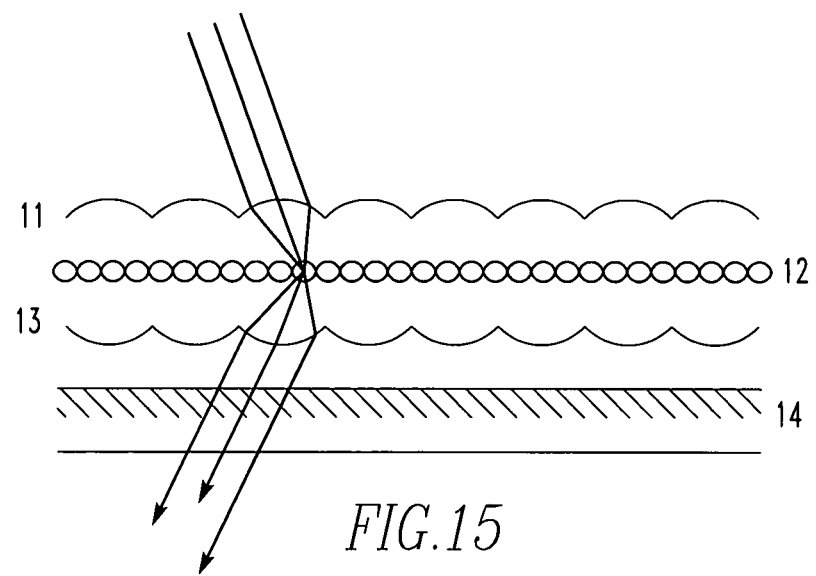
FIG. 15 shows the lenslet of FIG. 14 modified to enable multi-touch.

This mechanism can be modified to enable multi-touch as shown in FIG. 15. The Diffuser Screen 12 is modified so that it only diffuses light horizontally, not vertically. In one embodiment, such a screen is implemented by a very finely pitched array of vertical lenticular lenslets. A fourth element is added in front of the screen: an array of horizontal lenticular lenslets 14. This element is positioned so that its ridged face is away from the user and its smooth face is toward the user. In the figure, the view is from above, so the ridges of the first three elements are visible, whereas the ridges of the fourth element are represented by cross-hatching.

This fourth element serves two functions: (a) it serves to diffuse light that is in the projection path in the vertical direction, thereby allowing observers to see the image across the vertical span of the projection screen, and (b) it serves as a multitouch retroflective surface, becoming retroreflective in the vertical direction wherever the screen is touched by the observer.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A detection apparatus comprising:
   a first light source which produces light;
   a multilocation sensor having an aperture; and
   a sheet which receives light from the first light source, the sheet in communication with the multilocation sensor, which when a plurality of locations of the sheet are simultaneously activated by an object touching the sheet, the sensor senses these locations based on retroreflection of the light, simultaneously, the sheet includes a first lenslet array, a surface of the sheet is at a focal length of each lenticular lens of the first lenslet array, the first lenslet array is placed so that the first lenslet array's ridged side is facing toward the multilocation sensor and the first lenslet array's smooth side is facing away from the multilocation sensor, the smooth side forms the sheet's surface, the first light source is placed such that a line in space between the first light source and the aperture of the multilocation sensor is parallel to a line in space formed by each individual lenticular lenslet of the first lenslet array, light that arrives at the sheet from any direction is focused by each lenticular lens into a thin bright line of light upon the smooth side of the lenticular lens array so that light is concentrated into thin bright parallel stripes of light upon the smooth side of the sheet, when the light contacts the object touching the surface, the light is collimated retroreflected directly back toward the source.

2. The apparatus as described in claim 1 wherein the multilocation sensor, when a plurality of locations of the sheets surface are touched simultaneously, the multilocation sensor senses these locations, simultaneously.

3. The apparatus as described in claim 2 wherein the multilocation sensor includes an imager which produces images of the surface of the sheet.

4. The apparatus as described in claim 3 wherein the imager includes a camera and the multilocation sensor includes a computer in communication with the camera and receives images from the camera.

5. The apparatus as described in claim 4 wherein the first lenslet array has a smooth side and a ridged side, and the first lenslet array is positioned so the ridged side is facing the camera.

6. The apparatus as described in claim 5 wherein the first lenslet array has lateral spacing between the lenses to allow the sheet to be looked through.

7. The apparatus as described in claim 5 including a second lenslet array.

8. The apparatus as described in claim 7 wherein the second lenslet array is oriented perpendicular to the first lenslet array, and together the first and second lenslet arrays act as a rear projector screen.

9. The apparatus as described in claim 8 including a projector in communication with the computer that displays an image generated by the computer.

10. The apparatus as described in claim 1 wherein the multilocation sensor uses touch, pressure, or proximity to determine the locations.

11. The apparatus as described in claim 2 wherein the surface of the sheet is a thin-film comprising micro lenses.

12. The apparatus as described in claim 11 wherein the micro lenses are sparsely placed so the surface of the sheet appears transparent.

13. The apparatus as described in claim 12 wherein the sheet includes a substrate and both sides of the substrate are coated with thin films comprising micro lenses.

14. The apparatus as described in claim 3 wherein the camera includes a shutter to reduce optical noise.

15. The apparatus as described in claim 3 wherein the first light source is placed in a same focal plane of the lenticular lenses of the lenticular lens array and including a second light source placed in a different focal plane than the focal plane of the lenticular lenses of the lenticular lens array, and the computer subtracts pixel values from a second image formed when the second light source is on from corresponding pixel values of a first image formed when the first light source is on to remove almost all of that portion of the first image which is due to light that has been reflected back from objects not touching the smooth surface.

16. A method for detection comprising steps of:
   activating a first light source which produces light;
   activating simultaneously a plurality of locations of a sheet by an object touching the sheet, the sheet includes a first lenslet array, the sheet's surface is at a focal length of each lenslet lens of the first lenslet array; and
   sensing these locations simultaneously with a multilocation sensor having an aperture in communication with the sheet based on retroreflection of the light, the first lenslet array is placed so that the first lenslet array's ridged side is facing toward the sensor and the first lenslet array's smooth side is facing away from the multilocation sensor, the smooth side forms the sheet's surface, the first light source is placed such that a line in space between the first light source and the aperture of the multilocation sensor is parallel to a line in space formed by each individual lenticular lenslet of the first lenslet array, light that arrives at the sheet from any direction is focused by each lenticular lens into a thin bright line of light upon the smooth side of the lenticular lens array so that light is concentrated into thin bright parallel stripes of light upon the smooth side of the sheet, when the light contacts the object touching the surface, the light is collimated retroreflected directly back toward the source.

17. The method as described in claim 16 wherein the first light source is placed in a same focal plane of the lenticular lenses of the lenticular lens array and including a second light source placed in a different focal plane than the focal plane of the lenticular lenses of the lenticular lens array and wherein the sensing step includes the step of subtracting pixel values of a second image formed when the second light source is on from corresponding pixel values of a first image formed when the first light source is on to remove almost all of that portion of the first image which is due to light that has been reflected back from objects not touching the smooth surface.

18. A software program stored on a non-transitory computer readable medium comprising steps of:

activating a light source which produces light; and sensing simultaneously a plurality of locations of a sheet activated simultaneously by an object touching the sheet, the sheet includes a first lenslet array, the sheet's surface is at a focal length of each lens of the first lenslet array with a multilocation sensor having an aperture in communication with the sheet based on retroreflection of the light, the first lenslet array is placed so that the first lenslet array's ridged side is facing toward the sensor and the first lenslet array's smooth side is facing away from the multilocation sensor, the smooth side forms the sheet's surface, the first light source is placed such that a line in space between the first light source and the aperture of the multilocation sensor is parallel to a line in space formed by each individual lenticular lenslet of the first lenslet array, light that arrives at the sheet from any direction is focused by each lenticular lens into a thin bright line of light upon the smooth side of the lenticular lens array so that light is concentrated into thin bright parallel stripes of light upon the smooth side of the sheet, when the light contacts the object touching the surface, the light is collimated retroreflected directly back toward the source.

19. The software program stored on a non-transitory computer readable medium as described in claim 18 including a step of measuring an area on contact of these locations.

\* \* \* \* \*